United States Patent [19]
Tsumura et al.

[11] Patent Number: 6,126,973
[45] Date of Patent: *Oct. 3, 2000

[54] SOYBEAN PROTEIN HYDROLYSATE, PROCESS FOR PRODUCING THE SAME, AND MEAT PRODUCTS AND DRINKS USING THE SAME

[75] Inventors: Kazunobu Tsumura; Wataru Kugimiya; Kumiko Hoshino; Tohru Kudo, all of Ibaraki, Japan

[73] Assignee: Fuji Oil Company Limited, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/828,939

[22] Filed: Mar. 27, 1997

[30] Foreign Application Priority Data

Mar. 28, 1996 [JP] Japan .................................. 8-074434
Dec. 3, 1996 [JP] Japan .................................. 8-322896

[51] Int. Cl.$^7$ .............................. A23L 1/314; A23J 1/14
[52] U.S. Cl. .............................. 426/44; 426/52; 426/46; 426/56; 426/634; 426/641; 426/652; 426/590; 530/370; 530/377; 530/378; 435/18; 435/23; 435/24; 435/272
[58] Field of Search .............................. 426/44, 52, 590, 426/641, 63, 634, 656, 46, 652, 56, 58, 59, 646; 530/378, 370, 377; 435/18, 23, 24, 272

[56] References Cited

U.S. PATENT DOCUMENTS

| | | | |
|---|---|---|---|
| 3,303,182 | 2/1967 | Sakai et al. | 260/123.5 |
| 3,640,723 | 2/1972 | Uhlig et al. | 99/98 |
| 3,814,816 | 6/1974 | Gunther et al. | 426/46 |
| 3,843,802 | 10/1974 | Puski | 426/46 |
| 4,145,455 | 3/1979 | Fujimaki et al. | 426/614 |
| 4,172,828 | 10/1979 | Davidson et al. | 260/123.5 |
| 4,188,399 | 2/1980 | Shemer | 426/276 |
| 4,302,473 | 11/1981 | Mikami et al. | 426/46 |
| 4,349,576 | 9/1982 | Lehnhardt et al. | 426/582 |
| 4,368,151 | 1/1983 | Howard et al. | 260/123.5 |
| 4,370,267 | 1/1983 | Lehnhardt et al. | 260/123.5 |
| 4,375,431 | 3/1983 | Bradford et al. | 260/123.5 |
| 4,409,248 | 10/1983 | Lehnhardt et al. | 426/46 |
| 4,435,438 | 3/1984 | Lehnhardt et al. | 426/656 |
| 4,771,126 | 9/1988 | Hirotsuka et al. | 530/378 |
| 4,851,241 | 7/1989 | Tsuji et al. | 426/56 |
| 5,597,607 | 1/1997 | Samoto et al. | 426/656 |
| 5,674,548 | 10/1997 | Nakamura et al. | 426/598 |

FOREIGN PATENT DOCUMENTS 2184519  12/1973  France .

OTHER PUBLICATIONS

"Manufacture Protein Decompose Product Comprise Hydrolysis Vegetable Protein Enzyme Fractionate", Database WPI Section Ch, Week 8542, Derwent Publications Ltd., London, GB, Class D13, An 85–261149 & JP 60 176 549 A (Nisshin Oil Mills Ltd.) Sep. 10, 1985 (Abstract).

"Preparation of protein by hydrolysis—using proteinase with known pH optimum, and forming protein not at the optimum to reduce amt. of low mol. wt. fraction with bitter taste", Database WPI, Section Ch, Week 9433, Derwent Publications Ltd., London, GB, Class D13, An 94–268692 & JP 06 197 788 A (Fuji Seiyu KK) Jul. 19, 1994 (Abstract).

Fuji Oil Co., Ltd., "Production of Nongelatinized Soybean Protein", Patent Abstracts of Japan, vol. 12, No. 103 (C–485), Apr. 5, 1988 & JP 62 232341 A Oct. 12, 1987 (Abstract).

"Protein decomposed composition for pickling liq.—comprises solution containing soy protein decompose elastase", Database WPI Section Ch, Week 9412, Derwent Publications Ltd., London, GB, Class D13, AN 94–096990 & JP 06 046 799 A (Ajinomoto KK) Feb. 22, 1994 (Abstract).

*Primary Examiner*—Cynthia L. Nessler
*Attorney, Agent, or Firm*—Fish & Richardson P.C.

[57] ABSTRACT

The present invention provides a soy protein hydrolysate with a low content of β-conglycinin and a process for producing the same. The soy protein hydrolysate with a low content of β-conglycinin is prepared by allowing a proteolytic enzyme to act on soybean protein to selectively decompose β-conglycinin in the soybean protein, and the process for producing the same comprises allowing a proteolytic enzyme to act on soybean protein at a temperature of higher than 50° C. to less than 90° C., preferably 55 to 85° C., more preferably 60 to 80° C.

6 Claims, 1 Drawing Sheet

Lane No. 1 : Control group in Example 1 ( control )
Lane No. 2 : Comparative Example 1 ( 37°C )
Lane No. 3 : Example 2 ( 60°C )
Lane No. 4 : Example 1 ( 70°C )
Lane No. 5 : Example 3 ( 80°C )
Lane No. 6 : Comparative Example 2 ( 70°C, after thermal denaturation )

SOYBEAN PROTEIN HYDROLYSATE, PROCESS FOR PRODUCING THE SAME, AND MEAT PRODUCTS AND DRINKS USING THE SAME

FIELD OF THE INVENTION

The present invention relates to a soy protein hydrolysate with a low content of β-conglycinin wherein β-conglycinin as a major component in soy protein is selectively decomposed, a process for producing the same, and meat products and drinks using the same.

BACKGROUND OF THE INVENTION

A soybean contains a large amount of high-quality proteins and has been utilized as an excellent protein source from old times. In particular, soy protein isolate is useful as a food material by virtue of its high protein content and various functional characteristics such as emulsification properties, gelation properties, water holding properties etc., and it is used widely as a material for meat products, fish paste products, daily dishes, bread, confectionery, drinks etc.

The soybean protein is composed of various proteins of high molecular and complicated higher-order structure which are classified into 2S, 7S, 11S and 15S proteins etc. based on e.g. ultracentrifuge sedimentation rates, and these proteins have different characteristics even in physical properties.

For example, the soy protein isolate obtained by acid-precipitating soy milk extracted from de-fatted soybeans with water consists essentially of 7S globulin (mainly β-conglycinin) and 11S globulin (mainly glycinin), and each component has peculiar functional characteristics. However, these components are present in the form of their mixture and thus the inherent functional characteristics of each component cannot sufficiently be utilized in practical use.

Therefore, many attempts have been made to fractionate each component to utilize its inherent functions. For example, there are studies and reports of Wolf et al. and Thanh et al. on experimental fractionation, and there are proposals in Japanese Patent LOP Publication Nos. 56843/1973, 31843/1974, 86149/1976, 124457/1980, 153562/1980, 64755/1981, 132844/1982 and 36345/1983. However, these prior methods are still in the experimental stage and are not suitable for industrial fractionation.

Under these circumstances, it is proposed in Japanese Patent LOP Publication 187755/1986 that soybean protein components can be fractionated in an industrial separation method using pH and temperature regulation in the presence of sulfite etc., but troublesome pH and temperature regulations are essential in this method. There are also many investigations for functional improvements by use of proteolytic hydrolysis with proteases. For example, Japanese Patent Publication No. 24262/1973, Japanese Patent Publication No. 1028/1980, Japanese Patent LOP Publication No. 232341/1987, Japanese Patent Publication No. 14941/1992 etc. are concerned with such improvements, but all these methods are related to functional modifications such as in solubility, non-gelation properties etc. by preceding thermal denaturation of soybean protein for promotion of hydrolysis prior to enzymatic reaction, and there are no attempts at functional modifications by decomposing of only a specific component in soybean protein.

It is often hard for an native form of protein such as soybean protein to undergo decomposition with a hydrolytic enzyme such as protease (S. S. Nielsen et al., J. Agric. Food. Chem., 36, 869 (1988)) and thus protein denaturation by heating, alcohol etc. is common practice prior to proteolytic hydrolysis.

The soy protein isolate is a mixture consisting essentially of 7S globulin (mainly β-conglycinin) and 11S globulin (mainly glycinin) as described above, and it is known that there is a difference between the components in degree of denaturation caused under the same conditions. For example, it is known that 11S globulin is denatured easier at acidic pH than 7S globulin (I. Koshiyama, J. Sci. Fd Agric., 23, 853 (1972)), and also that 7S globulin is denatured by heating at lower temperature than 11S globulin (S. Damodaran, J. Agric, Food Chem., 36, 262 (1988)). In the method for enzymatic decomposition up to now, however, it was not possible to specifically and exclusively decompose a specific component in soybean protein, possibly due to uncontrollable protein denaturation treatments, such as excessive heating, alcohol treatment, etc. prior to enzymatic decomposition.

If it is possible to decompose exclusively specific components in soybean protein, a soybean protein having inherent functional characteristics would be obtained from a mixture of the respective components and such protein could be applied further to various fields of foods.

For production of meat products (meat ham, meat sausage, meat bacon, roast pork, meat fried products (fried pork cutlet, tempura) etc.), particularly for production of ham, there is a method in which a pickle solution containing soy protein and other binding materials (proteinous materials) such as egg white, sodium casein, milk protein, blood protein etc., as well as seasonings such as common salt, sugars etc., spices, binding reinforcing agents such as polymerized phosphate etc., coloring agents such as nitrite etc., emulsion stabilizers such as sodium casein etc., antioxidants such as ascorbate etc., seasonings such as sodium glutamate etc., preservatives such as potassium sorbate etc., sweeteners, etc. (referred to hereinafter as "pickle solution of the present invention" is mixed with or injected into meat to improve feelings when eaten, such as water retention characteristics, lipid inclusion properties, binding properties, hardness and elasticity. In the method of injecting the pickle solution into meat, however, if their contents are increased unnecessarily, their viscosity would also be raised and cause difficult injection of such proteinous materials into meat through an injector, whereas if their contents are lowered unnecessarily, the improvement effects could not be obtained as expected.

By virtue of its excellent improvement effects as described above, soy protein is compounded into the pickle solution, but because soy protein itself has high viscosity, there is a limit to its content. To prevent soy protein from raising viscosity, Japanese Patent LOP Publication No. 328939/1993 proposes use of a hydrolysate of soy protein treated with a protease, and Japanese Patent LOP Publication No. 46799/1994 proposes treatment of soybean protein with a special enzyme, but under the present circumstances there is still demand for soybean proteinous materials which are suitable for food manufacturing, excellent in feeling when eaten, in flavor, appearance etc., and easy to handle due to low viscosity when prepared, e.g. in injecting the pickle solution into meat.

Further, soy protein itself has high viscosity and is difficult to drink, so there is a limit to its content in drinks although soy protein is excellent in nutrients.

SUMMARY OF THE INVENTION

Under these circumstances, an object of the present invention is to provide a soy protein hydrolysate wherein β-conglycinin as a major component is selectively decomposed, as well as a process for producing the same. Another object is to provide meat products and drinks using this soy protein hydrolysate.

As a result of their extensive research, the present inventors directed their attention to the fact that glycinin and β-conglycinin as major components in soybean protein have different degrees of denaturation in a specific temperature range, and they found that a soy protein hydrolysate with β-conglycinin selectively decomposed can be obtained by allowing a proteolytic enzyme to act in this temperature range, and that this soy protein hydrolysate can be used to improve product qualities and efficiency in operation for production of meat products and drinks, to arrive at the completion of the present invention.

That is, the present invention is a soy protein hydrolysate with a low content of β-conglycinin, which is prepared by allowing a proteolytic enzyme to act on soybean protein to selectively decompose β-conglycinin in the soybean protein.

In addition, the present invention is a soy protein hydrolysate with a low content of β-conglycinin, prepared by allowing a proteolytic enzyme to act on soybean protein to selectively decomposes β-conglycinin in the soybean protein, wherein the glycinin/β-conglycinin ratio is 1.5 or more, preferably 2.5 or more, more preferably 3.0 or more, and the ratio of trichloroacetic acid-soluble protein to the whole protein is 5 to 20% by weight.

Further, the present invention is a process for producing a soy protein hydrolysate with a low content of β-conglycinin, in which a proteolytic enzyme is allowed to act on soybean protein at a temperature of higher than 50° C. to less than 90° C., preferably 55 to 85° C., more preferably 60 to 80° C. to prepare a soy protein hydrolysate with a low content of β-conglycinin.

Furthermore, the present invention is a food meat product comprising a soy protein hydrolysate with a low content of β-conglycinin mixed with or injected into raw meat, wherein the glycinin/β-conglycinin ratio is 1.5 or more, preferably 2.5 or more, more preferably 3.0 or more, and the ratio of trichloroacetic acid-soluble protein to the whole protein is 5 to 20% by weight.

Finally, the present invention is a drink comprising a soy protein hydrolysate with a low content of β-conglycinin, wherein the glycinin/β-conglycinin ratio is 1.5 or more, preferably 2.5 or more, more preferably 3.0 or more, and the ratio of trichloroacetic acid-soluble protein to the whole protein is 5 to 20% by weight.

DETAILED DESCRIPTION OF THE INVENTION

Figure 1:
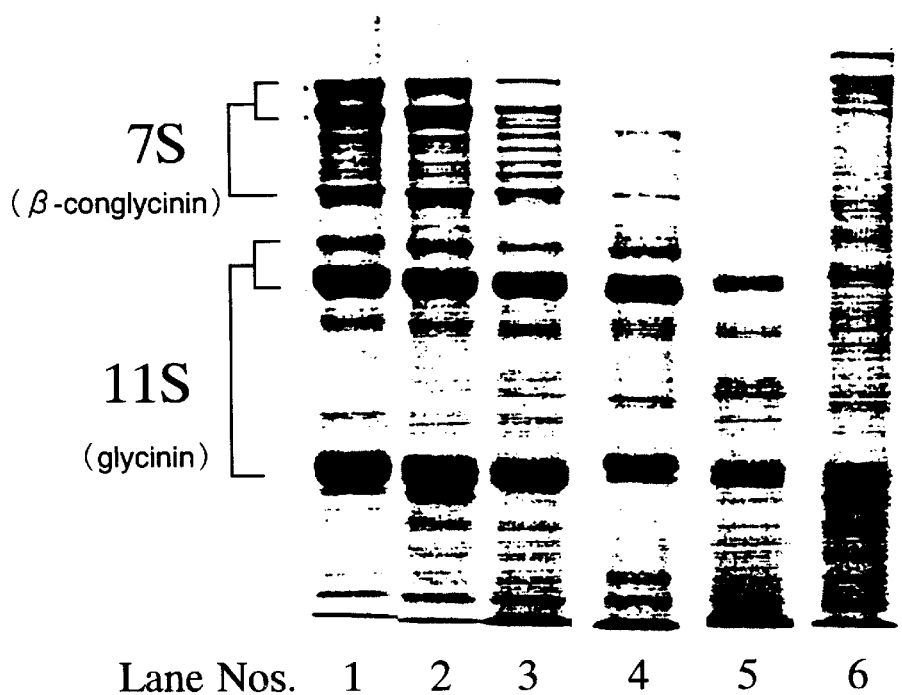
FIG. 1 is a profile in SDS-electrophoresis.

First, the process for producing a soy protein hydrolysate with a low content of β-conglycinin is described in detail. The soybean protein used in the process for producing a soy protein hydrolysate with a low content of β-conglycinin includes soybeans, hulled soybeans, whole-fat soy milk containing soybean protein, de-fatted soy milk, concentrated soy protein, soy protein isolate etc., and preferably used is a processed product of soybean protein subjected to processing treatment accompanied by little or no protein modification. The variety and producing district of the starting soybeans are not limited. Generally, a preferable starting material is de-fatted soybeans subjected to low-temperature extraction treatment with n-hexane as extraction solvent, and low-denatured de-fatted soybeans with a NSI (nitrogen solubility index) of 60 or more, preferably 80 or more, are particularly preferable. Water extracts of such low-denatured de-fatted soybeans, such as de-fatted soy milk, concentrated soy protein and soy protein isolate, are used preferably in the present invention.

It is necessary that the proteolytic enzyme used in the present invention is an enzyme preparation having proteolytic hydrolysis activity at a temperature of more than 50° C. to less than 90° C., preferably 55 to 85° C. These preparations may be commercially available enzymes derived from plants, animal organs or microorganisms, and their origin is not particularly limited. Examples of such enzymes are papain, bromelain, ficin etc., most preferably papain.

To carry out the present invention, the proteolytic enzyme is allowed to act on soybean protein in the process of manufacturing soy protein, in which β-conglycinin is selectively decomposed with the enzyme at a temperature of more than 50° C. to less than 90° C., preferably 55 to 85° C., more preferably 60 to 80° C. In the manufacturing of soy protein isolate, for example, low-denatured de-fatted soybeans are extracted with water to be separated into a water-insoluble fraction (bean curd refuse) and a water-soluble fraction (soy milk), and this water-soluble fraction is subjected to isoelectric precipitation to be separated further into a water-insoluble fraction (curd) and a water-soluble fraction (whey), and this acid-precipitated curd is suspended in water, then neutralized and subjected to hydrolysis reaction at 55 to 85° C., more preferably 60 to 80° C. Then, the reactant is sterilized and dried as a product. Alternatively, the reactant may be subjected to acid precipitation at pH 6 i.e. the isoelectric point of glycinin, then separated by centrifugation into a supernatant (mainly a hydrolysate of β-conglycinin) and a precipitate (mainly glycinin not decomposed), and each may be neutralized, sterilized and dried as products.

Usually, the enzyme reaction can be carried out after adjusting an aqueous suspension containing intact soybean protein to pH 7 and then adding a proteolytic enzyme to it in the range of 0.001 to 0.5%, preferably 0.01 to 0.1% based on the solid content in said aqueous suspension. The reaction pH is generally in the range of pH 4 to 9, preferably pH 5 to 8. The reaction is carried out generally for 5 minutes to 2 hours, preferably 10 to 30 minutes. Continuous treatment can also be effected by passing said aqueous suspension through a column packed with an immobilized enzyme. Oils, fats and/or emulsifying agents may be added if necessary before or after the sterilization step, or after the drying step.

The soybean protein after enzymatic digestion is separated into its components by SDS-electrophoresis and stained with Coomassie Blue. The density of each band thus stained can be used to evaluate the change due to hydrolysis of each component in the soybean protein. According to the present invention, there can be easily obtained a soy protein hydrolysate with a low content of β-conglycinin, wherein the glycinin/β-conglycinin ratio is 1.5 or more, preferably 2.5 or more, more preferably 3.0 or more, and the ratio of trichloroacetic acid-soluble protein to the whole protein (referred to hereinafter as "T.C.A soluble N.%") is 5 to 20%, preferably 6 to 15%. The T.C.A. soluble N.% of the hydrolysate can be easily quantified by measuring Kjeldahl nitrogen in its protein solubilized with 0.22 M trichloroacetic acid solution.

The soy protein hydrolysate with a low content of β-conglycinin thus obtained is used in various food materials etc. to make full use the functional characteristics of glycinin, and this hydrolysate is excellent in nutrition and physiological functions because of its decreased content of β-conglycinin as a major allergen protein in the soybean protein.

The soy protein hydrolysate with a low content of β-conglycinin can be used particularly in production of meat products or drinks to attain superior functions. Before injecting the pickle solution into raw meat in production of meat products especially ham, the soy protein hydrolysate with a low content of β-conglycinin can be best utilized by adding it to the pickle solution, thus bringing about improvements in product qualities as well as in efficiency of operation for manufacturing. In this case, the soy protein hydrolysate with a low content of β-conglycinin can be added to the pickle solution in the range of 2 to 15%, preferably 4 to 10% by weight. If necessary, other proteinous materials or ingredients used in a usual pickle solution, such as common salt, sugars, polymerized phosphate, nitrite, seasonings etc. can also be added to the pickle solution of the present invention.

The soybean protein used in the present invention includes a soy protein hydrolysate with a low content of β-conglycinin where the glycinin/β-conglycinin ratio is 1.5 or more, preferably 2.5 or more, more preferably 3.0 or more, and the T.C.A. soluble N.% is 5 to 20%, preferably 6 to 15%.

The soy protein hydrolysate with a low content of β-conglycinin can also be used in producing drinks to confer superior functions on them. The soy protein hydrolysate with a low content of β-conglycinin can be added to e.g. soups, nutrition-enriched drinks etc. in the range of 0.1 to 20% preferably 1 to 15% by weight. If necessary, oils, fats, sugars, spices, seasonings etc. as well as other proteinous materials can also be added. The drinks thus obtained are of low viscosity and extremely to easy to drink.

EXAMPLES

Hereinafter, the present invention is described in detail by reference to Examples, which however are not intended to limit the scope of the present invention.

Example 1

To 100 g low-denatured de-fatted soybeans (nitrogen solubility index: NSI>80) obtained using n-hexane as extraction solvent was added 10-fold excess of water, and the suspensions were extracted at room temperature and pH 7 for 1 hour and then centrifuged to give 950 g de-fatted soy milk. 950 g of the de-fatted soy milk was adjusted to pH 4.5 with hydrochloric acid and then centrifuged to remove the whey fraction, and 100 g acid-precipitated curd was thus obtained. 100 g of the acid-precipitated curd was suspended in water and then neutralized with sodium hydroxide and the temperature of this aqueous suspension was adjusted to 70° C. Papain (Sigma) was added in an amount of 0.05% based on the solid content of the suspension, and enzyme reaction was carried for 30 minutes. The enzyme reactant was neutralized with sodium hydroxide, and the solution was heated at 140° C. for 15 seconds and spray-dried to give 35 g soy protein (test group). As a control group, the acid-precipitated curd was suspended in water, then neutralized with sodium hydroxide and heated at 140° C. for 15 seconds and spray-dried (control group).

10 μg each sample of the test group and control group was separated by SDS-electrophoresis and the density of each band stained with Coomassie Blue was examined with a densitometer. The glycinin/β-conglycinin ratios in the test group and control group were determined. The result is shown in Table 1, and nearly the whole of β-conglycinin was selectively decomposed in the soybean protein in the test group.

Example 2

An acid-precipitated curd prepared in the same manner as in Example 1 was suspended in water, and the aqueous suspension was neutralized with sodium hydroxide and its temperature was adjusted to 60° C., and papain (Sigma) was added in an amount of 0.05% based on the solid content of the suspension, and enzyme reaction was carried for 30 minutes. The enzyme reactant was neutralized with sodium hydroxide, and the solution was heated at 140° C. for 15 seconds and spray-dried to prepare soy protein.

Example 3

An acid-precipitated curd prepared in the same manner as in Example 1 was suspended in water, and the aqueous suspension was neutralized with sodium hydroxide and its temperature was adjusted to 80° C., and papain (Sigma) was added in an amount of 0.05% based on the solid content of the suspension, and enzyme reaction was carried for 30 minutes. The enzyme reactant was neutralized with sodium hydroxide, and the solution was heated at 140° C. for 15 seconds and spray-dried to prepare soy protein.

Comparative Example 1

An acid-precipitated curd prepared in the same manner as in Example 1 was suspended in water, and the aqueous suspension was neutralized with sodium hydroxide and its temperature was adjusted to 37° C., and papain (Sigma) was added in an amount of 0.05% based on the solid content of the suspension, and enzyme reaction was carried for 30 minutes. The enzyme reactant was neutralized with sodium hydroxide, and the solution was heated at 140° C. for 15 seconds and spray-dried to prepare soy protein.

Comparative Example 2

An acid-precipitated curd prepared in the same manner as in Example 1 was suspended in water, and the aqueous suspension was neutralized with sodium hydroxide and denatured by heating at 90° C. for 30 minutes. Then, its temperature was adjusted to 70° C., and papain (Sigma) was added in an amount of 0.05% based on the solid content of the suspension, and enzyme reaction was carried for 30 minutes. The enzyme reactant was neutralized with sodium hydroxide, and the solution was heated at 140° C. for 15 seconds and spray-dried to prepare soy protein.

10 μg each of the samples in Examples 2 and 3 and Comparative Examples 1 and 2 was separated by SDS-PAGE and the density of each band stained with Coomassie Blue was examined with a densitometer, and the glycinin/β-conglycinin ratio in each sample was determined from the density. The result is shown in Table 1. As shown in the results in Comparative Examples 1 and 2, the decomposition of β-conglycinin and glycinin hardly occurs at a reaction temperature under 60° C., while the decomposition of both glycinin and β-conglycinin occurs if subjected to excessive thermal denaturation prior to enzymatic decomposition and no selectively decomposed product can be obtained.

TABLE 1

| Reaction Temperature | Glycinin/β-Conglycinin Ratio | T.C.A. Soluble N. % | |
|---|---|---|---|
| 70° C. | 7.9 | 7 | Example 1 |
| 60° C. | 5.0 | 5 | Example 2 |
| 80° C. | 17.1 | 15 | Example 3 |
| 37° C. | 1.4 | 4 | Com. Ex. 1 |
| 70° C. (after thermal denaturation) | 2.0 | 25 | Com. Ex. 2 |

Com. Ex.: Comparative Example

Example 4

To 10 kg low-denatured de-fatted soybeans (nitrogen solubility index: NSI>80) obtained using n-hexane as extraction solvent was added 10-fold excess of water, and the suspensions were extracted at room temperature and pH 7 for 1 hour and then centrifuged to give 95 kg de-fatted soy milk. 95 kg of the de-fatted soy milk was adjusted to pH 4.5 with hydrochloric acid and then centrifuged to remove the whey fraction, and 10 kg acid-precipitated curd was thus obtained. 10 kg of the acid-precipitated curd was suspended in water and then neutralized with sodium hydroxide and the temperature of the aqueous suspension was adjusted to 70° C. Papain (Nagase Seikagaku K.K.) was added in an amount of 0.1% based on the solid content of the suspension, and enzyme reaction was carried for 30 minutes. The enzyme reactant was heated at 140° C. for 15 seconds and spray-dried to give 3.5 kg soy protein.

Comparative Example 3

An acid-precipitated curd prepared in the same manner as in Example 4 was suspended in water, and the aqueous suspension was neutralized with sodium hydroxide. Then, its temperature was adjusted to 50° C. and protin™ (Daiwa KaseiK.K.) was added in an amount of 0.1% based on the solid content of the suspension, and enzyme reaction was carried for 30 minutes. The enzyme reactant was sterilized by heating at 140° C. for 15 seconds and spray-dried to prepare soy protein.

The T.C.A. soluble N.% and glycinin/β-conglycinin ratio of each soy protein hydrolysate prepared in Example 4 and Comparative Example 3 are shown in Table 2 below.

TABLE 2

| | Example 4 | Comparative Example 3 |
|---|---|---|
| glycinin/β-conglycinin ratio | 7.9 | 1.3 |
| T.C.A. soluble N. % | 7 | 7 |

Example 5

The soy protein hydrolysate prepared in Example 4 was used in the composition shown in Table 3 to prepare a pickle solution. 100 parts by weight of the pickle solution were injected through an injector to 100 parts by weight of a loin of pork and then subjected to tumbling (rotation under stirring) at low temperature for 15 hours in a rotary massage machine and packed into a casing. After heating at 65° C. for 30 minutes, it was dried, then smoked at 75° C. for 30 minutes, steamed at 78° C. and cooled to prepare ham.

TABLE 3

| Raw Materials | Composition (weight-%) |
|---|---|
| soy protein hydrolysate | 5.0 |
| dry egg white | 5.0 |
| sodium caseinate | 2.0 |
| common salt | 2.8 |
| sodium nitrite | 0.02 |
| sodium L-ascorbate | 0.06 |
| polymerized phosphate | 0.7 |
| corn syrup powder | 5.0 |
| sodium succinate | 0.02 |
| seasoning | 0.3 |
| coloring | 0.2 |
| water | 78.9 |
| total | 100.0 |

The prepared pickle solution was cooled overnight in a refrigerator and then determined for viscosity with a Brookfield type viscometer. The breaking load of the prepared ham was determined by measuring its sample of 2 mm in thickness with Leonar™ (K.K. Yamaden). To determine water retention, a load of 1 kg/cm$^2$ was applied to the prepared ham (5 mm thickness) for 30 minutes, and the ratio (%) of the water separated from the sample to the original weight (referred to "water-release ratio") was determined and used to express its ability to retain water. Its appearance and organoleptic evaluation was made by a panel of 5 skilled persons using 5-point evaluation (point 5, excellent; point 4, good; point 3, ordinary; point 2, poor; point 1, worse). The average evaluation points are shown in Table 4.

Comparative Example 4

The soy protein hydrolysate prepared in Comparative Example 3 was used in the composition shown in Table 3 to prepare a pickle solution, and ham was prepared using this pickle solution in the same manner as in Example 5. The pickle solution and ham were examined for physical properties and evaluated by the panel in the same manner as in Example 5. The results are shown in Table 4.

TABLE 4

| | Example 5 | Comparative Example 4 |
|---|---|---|
| pickle solution | | |
| viscosity (centipoise: cp) | 35 | 60 |
| defoaming | good | poor |
| ham evaluation | | |
| breaking load (gf) | 890 | 710 |
| water-release ratio (%) | 11 | 15 |
| appearance evaluation (point) | 4.8 | 3.8 |
| organoleptic evaluation (point) | 4.8 | 3.6 |

The pickle solution using the soy protein hydrolysate prepared in Example 4 had low viscosity and good defoaming properties and was excellent in operativeness in injecting it through an injector. In addition, the prepared ham (Example 5) indicated a high breaking load and a low water-release ratio and was thus excellent in the ability to retain water. In the appearance evaluation, the ham was rated as preferable because there was no gathering of the pickle solution etc. in it. In the organoleptic evaluation, the ham felt good in chewing and tasted good as well. On the other hand, the pickle solution using the soy protein hydrolysate prepared in Comparative Example 3 had slightly high viscosity and poor defoaming properties. In the appearance evaluation of the prepared ham (Comparative Example 4), there was some gatherings of the pickle solution in it, and in the organoleptic evaluation, the ham was felt soft in some degree.

Examples 6, 7 and 8

The soy protein hydrolysate obtained in Example 4 was used in the composition shown in Table 5 to prepare a pickle solution, and ham (Example 6) was prepared using this pickle solution in the same manner as in Example 5. Separately, soy protein hydrolysates (Example 7, glycinin/β-conglycinin=3.1, T.C.A. soluble N.%=5; Example 8, glycinin/β-conglycinin=5.3, T.C.A. soluble N.%=14) were prepared respectively in the same manner as in Example 4 except that the amount of papain added was 0.05% and 0.2%, then the soy protein hydrolysates were used in the composition shown in Table 5 to prepare pickle solutions and then hams (Examples 7 and 8) were prepared respectively in the same manner as in Example 5. The pickle solutions and hams were examined for physical properties and evaluated by the panel in the same manner as in Example 5. The results are shown in Table 6.

TABLE 5

| Raw Materials | Composition (weight-%) |
| --- | --- |
| soy protein hydrolysate | 6.0 |
| dry egg white | 4.0 |
| sodium caseinate | 2.0 |
| common salt | 2.8 |
| sodium nitrite | 0.02 |
| sodium L-ascorbate | 0.06 |
| polymerized phosphate | 0.7 |
| corn syrup powder | 5.0 |
| sodium succinate | 0.02 |
| seasoning | 0.3 |
| coloring | 0.2 |
| water | 78.9 |
| total | 100.0 |

Comparative Examples 5, 6 and 7

The soy protein hydrolysate obtained in Comparative Example 3 was used in the composition shown in Table 5 to prepare a pickle solution, and ham (Comparative Example 5) was prepared using this pickle solution in the same manner as in Example 5. Separately, soy protein hydrolysates (Comparative Example 6, glycinin/β-conglycinin=1.3, T.C.A. soluble N.%=5; Comparative Example 7, glycinin/β-conglycinin =1.4, T.C.A. soluble N.%=22) were prepared respectively in the same manner as in Example 5 except that the amount of protin added was 0.05% and 0.2% respectively, then the soy protein hydrolysates were used in the composition shown in Table 5 to pickle solutions, and hams (Comparative Examples 6 and 7) were prepared respectively in the same manner as in Example 5. The pickle solutions and hams were examined for physical properties and evaluated by the panel in the same manner as in Example 5. The results are shown in Table 7.

TABLE 6

| | Example 6 | Example 7 | Example 8 |
| --- | --- | --- | --- |
| pickle solution | | | |
| viscosity (cp) | 44 | 48 | 38 |
| defoaming | good | good | good |
| ham evaluation | | | |
| breaking load (gf) | 1450 | 1580 | 1280 |
| water-release ratio (%) | 12 | 11 | 13 |
| appearance evaluation (point) | 4.6 | 4.4 | 4.0 |
| organoleptic evaluation (point) | 4.4 | 4.4 | 3.8 |

TABLE 7

| | Comparative Example 5 | Comparative Example 6 | Comparative Example 7 |
| --- | --- | --- | --- |
| pickle solution | | | |
| viscosity (cp) | 94 | 128 | 58 |
| defoaming | very bad | very bad | very bad |
| ham evaluation | | | |
| breaking load (gf) | 1390 | 1410 | 880 |
| water-release ratio (%) | 14 | 15 | 18 |
| appearance evaluation (point) | 3.4 | 3.2 | 2.8 |
| organoleptic evaluation (point) | 3.2 | 3.4 | 2.0 |

The pickle solutions in Examples 6 to 8 had low viscosity and good defoaming properties and were thus excellent in operativeness in injecting them through an injector, and the prepared hams were rated as good in both the appearance evaluation and organoleptic evaluation. On the other hand, the pickle solutions in Comparative Examples 5 to 7 had high viscosity and very worse defoaming properties, which made their injection through an injector difficult. In the appearance evaluation, there were gatherings of the pickle solution in the prepared hams, and in the organoleptic evaluation the hams felt brittle. The pickle solution in Comparative Example 7 had slightly low viscosity but was extremely inferior in defoaming properties, so its injection through an injector was considerably difficult. In the appearance evaluation, there were gatherings of the pickle solution in the prepared ham, and in the organoleptic evaluation the ham felt very brittle.

Example 9 and Comparative Example 8

The soy protein hydrolysate prepared in Example 4 was used in the composition shown in Table 8 to prepare a sausage. In Comparative Example 8, the soy protein hydrolysate was replaced by equivalent amounts of major raw materials (pork, lard, and water).

TABLE 8

| | Composition (weight-%) | |
| --- | --- | --- |
| Raw Materials | Example 9 | Comparative Example 8 |
| pork | 41.8 | 44.0 |
| lard | 18.0 | 19.0 |
| water | 32.46 | 34.26 |
| soy protein hydrolysate | 5.0 | 0 |
| common salt | 1.7 | 1.7 |
| sodium nitrate | 0.01 | 0.01 |
| sodium L-ascorbate | 0.03 | 0.03 |

TABLE 8-continued

| Raw Materials | Composition (weight-%) | |
|---|---|---|
| | Example 9 | Comparative Example 8 |
| sodium pyrophosphate | 0.3 | 0.3 |
| sugar | 0.3 | 0.3 |
| potassium sorbate | 0.1 | 0.1 |
| seasoning | 0.3 | 0.3 |
| total | 100.0 | 100.0 |

The breaking load of the prepared sausage was determined by measuring its sample of 2 mm in thickness with Leonar (K.K. Yamaden). Its appearance and organoleptic evaluation was made by the panel of 5 skilled persons using 5-point evaluation (point 5, excellent; point 4, good; point 3, ordinary; point 2, poor; point 1, worse), and the average evaluation points are shown in Table 9.

TABLE 9

| | Example 9 | Comparative Example 8 |
|---|---|---|
| breaking load (gf) | 285 | 235 |
| appearance evaluation (point) | 4.8 | 4.3 |
| organoleptic evaluation (point) | 4.6 | 4.1 |

Example 10 and Comparative Example 9

The soy protein hydrolysate prepared in Example 4 and the soy protein hydrolysate prepared in Comparative Example 3 were used to prepare soups with the composition shown in Table 10.

TABLE 10

| Raw Materials | Composition (weight-%) |
|---|---|
| soy protein hydrolysate | 8.0 |
| sodium casein | 1.0 |
| corn powder | 3.5 |
| whole-fat powdered milk | 0.5 |
| skim powdered milk | 0.5 |
| seasoning | 0.5 |
| water | 86.0 |
| total | 100.0 |

The prepared soups were evaluated by the 5 skilled persons. Every person evaluated that the soup in Example 10 was lower in viscosity and easier to drink than the soup in Comparative Example 9.

Example 11 and Comparative Example 10

The soy protein hydrolysate prepared in Example 4 and the soy protein hydrolysate prepared in Comparative Example 3 were used to prepare cocoa drinks with the composition shown in Table 11.

TABLE 11

| Raw Materials | Composition (weight-%) |
|---|---|
| soy protein hydrolysate | 5.0 |
| granule sugar | 5.0 |
| cocoa powder | 1.0 |
| skim powdered milk | 1.0 |
| sugar ester | 0.1 |
| water | 87.9 |
| total | 100.0 |

The organoleptic evaluation of the prepared drinks was made by the panel of 5 skilled persons. As a result, every person evaluated that the drink in Example 11 was lower in viscosity and easier to drink.

Effect of the Invention

According to the present invention, a soy protein having only β-conglycinin selectively decomposed can be easily obtained, and this protein can be applied widely to various fields of foods, such as meat products, drinks etc., thus highly contributing to developments in industry.

What is claimed is:

1. A process for producing a soy protein hydrolysate with a low content of β-conglycinin, a glycinin and a trichloroacetic acid-soluble protein wherein a proteolytic enzyme is allowed to act on soybean protein which has been obtained without thermal denaturation from low-denatured de-fatted soybeans having a nitrogen solubility index of 60 or more, at a temperature of 60 to 80° C. to selectively decompose β-conglycinin in the soybean protein until the glycinin/β-conglycinin ratio is 3.0 or more and the ratio of the trichloroacetic acid-soluble protein to whole protein (TCA ratio) is about 5 to 20%, and then raising the temperature enough to cease the enzyme reaction.

2. The process for producing the soy protein hydrolysate according to claim 1, wherein the low-denatured de-fatted soybeans has a nitrogen solubility index of 80 or more.

3. A soy protein hydrolysate comprising a low content of β-conglycinin, a glycinin and a trichloroacetic acid-soluble protein, which is prepared by allowing a proteolytic enzyme to act on soybean protein which has been obtained without thermal denaturation from low-denatured de-fatted soybeans having a nitrogen solubility index of 60 or more, at a temperature of 60 to 80° C. to selectively decompose β-conglycinin in the soybean protein until the glycinin/β-conglycinin ratio is 3.0 or more and the ratio of the trichloroacetic acid-soluble protein to whole protein (TCA ratio) is about 5 to 20%.

4. The soy protein hydrolysate according to claim 3, wherein the low-denatured de-fatted soybeans has a nitrogen solubility index of 80 or more.

5. A food meat product comprising the soy protein hydrolysate of claim 3 or 4.

6. A drink comprising the soy protein hydrolysate of claim 3 or 4.

* * * * *